US008054507B2

(12) United States Patent
Wang et al.

(10) Patent No.: US 8,054,507 B2
(45) Date of Patent: Nov. 8, 2011

(54) IMAGE DATA LUMINANCE COMPENSATING METHOD AND SHEET-FEEDING SCANNING APPARATUS USING SUCH METHOD

(75) Inventors: Sheng-Ping Wang, Taipei (TW); Chang-Yung Feng, Taipei (TW)

(73) Assignee: Primax Electronics Ltd., Taipei (TW)

( * ) Notice: Subject to any disclaimer, the term of this patent is extended or adjusted under 35 U.S.C. 154(b) by 583 days.

(21) Appl. No.: 12/268,931

(22) Filed: Nov. 11, 2008

(65) Prior Publication Data

US 2009/0251745 A1 Oct. 8, 2009

(30) Foreign Application Priority Data

Apr. 2, 2008 (TW) .............................. 97111926 A

(51) Int. Cl.
*H04N 1/40* (2006.01)

(52) U.S. Cl. ........ 358/3.24; 358/504; 358/505; 358/475

(58) Field of Classification Search ................. 358/1.1, 358/3.24, 504, 505
See application file for complete search history.

(56) References Cited

U.S. PATENT DOCUMENTS

| 7,590,501 B2* | 9/2009 | Klassen .......................... 702/85 |
| 7,733,519 B2* | 6/2010 | Feng et al. ..................... 358/1.6 |
| 2002/0140996 A1* | 10/2002 | Spears et al. .................. 358/504 |
| 2006/0001919 A1* | 1/2006 | Owens et al. ................. 358/498 |

* cited by examiner

*Primary Examiner* — King Poon
*Assistant Examiner* — Jamares Q Washington
(74) *Attorney, Agent, or Firm* — Kirton & McConkie; Evan R. Witt

(57) ABSTRACT

The present invention relates to an image data luminance compensating method and a sheet-feeding scanning apparatus using such an image data luminance compensating method. According to the reference luminance value change of the reference background strip before and after the current document passes through the scan operating region, the luminance gain associated with compensation of the image data of the next document is determined.

19 Claims, 6 Drawing Sheets

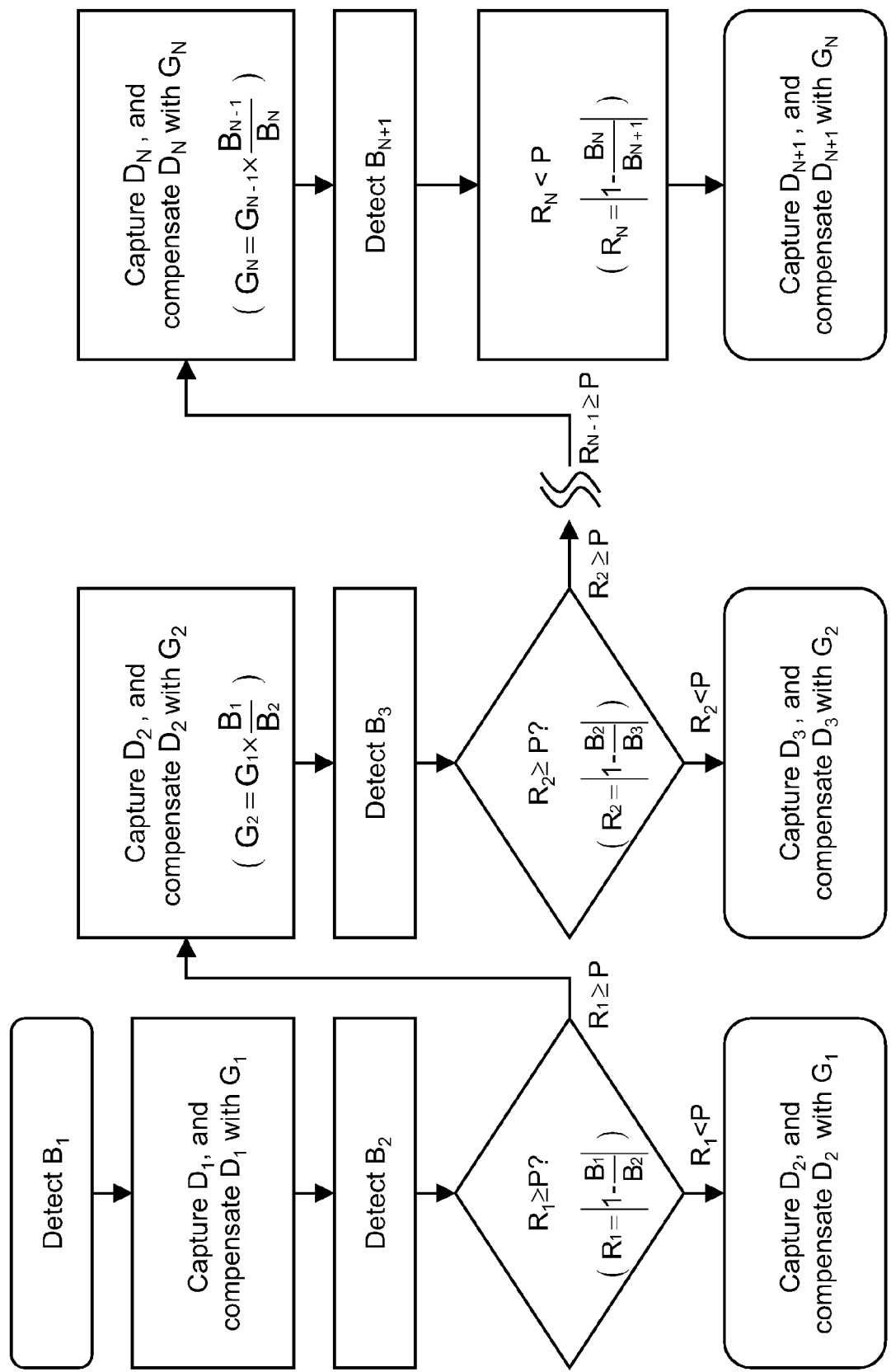

IMAGE DATA LUMINANCE COMPENSATING METHOD AND SHEET-FEEDING SCANNING APPARATUS USING SUCH METHOD

FIELD OF THE INVENTION

The present invention relates to an image data luminance compensating method, and more particularly to an image data luminance compensating method for use in a sheet-feeding scanning apparatus, thereby directly performing the scanning operation in the initial stage from start of the sheet-feeding scanning apparatus without the need of waiting for the warm-up time period.

BACKGROUND OF THE INVENTION

Nowadays, sheet-feeding scanning apparatuses such as image scanners, a multifunction peripherals or printers are commonly used as important document processing apparatuses in offices or homes. For a purpose of successively scanning many sheet documents at a time, an automatic paper feeder (ADF) is usually integrated into the sheet-feeding scanning apparatus. After a stack of documents to be scanned are placed on the sheet input tray of the automatic document feeder, the sheet-feeding mechanism of the automatic document feeder will successively transport the documents across the scanning module of the sheet-feeding scanning apparatus. After the images of the documents are read by the scanning module, image data files are generated or document copies are directly outputted.

As known, in the initial stage from start of the sheet-feeding scanning apparatus, the luminance of the lamp tube in the sheet-feeding scanning apparatus is usually unstable. After the sheet-feeding scanning apparatus has been turned on for a warm-up time period, the luminance of the lamp approaches stable. In other words, a sufficient warm-up time period is necessary in order to perform a scanning operation.

Therefore, there is a need of providing a sheet-feeding scanning apparatus capable of performing the scanning operation without the need of waiting for the warm-up time period.

SUMMARY OF THE INVENTION

It is an object of the present invention to provide a sheet-feeding scanning apparatus capable of performing the sheet-feeding operation and the scanning operation immediately after the sheet-feeding scanning apparatus is turned on.

Another object of the present invention provides an image data luminance compensating method for use in a sheet-feeding scanning apparatus so as to accurately compensating the luminance value of the image data in the initial stage from start of the sheet-feeding scanning apparatus.

In accordance with an aspect of the present invention, there is provided an image data luminance compensating method for use in a sheet-feeding scanning apparatus. The sheet-feeding scanning apparatus includes a scan operating region, an image capturing module and a reference background strip. The image capturing module and the reference background strip are disposed on opposite sides of the scan operating region. The image data luminance compensating method includes the following steps. Firstly, the luminance value of the reference background strip is sensed by the image capturing module, thereby obtaining a first reference luminance value $B_1$. Next, a first image data $D_1$ of a first document passing through the scan operating region is captured by the image capturing module, and the first image data $D_1$ is compensated with the first luminance gain $G_1$. Next, the luminance value of the reference background strip is sensed by the image capturing module, thereby obtaining a second reference luminance value $B_2$. Next, a first luminance difference ratio $R_1$ is calculated according to the first reference luminance value $B_1$ and the second reference luminance value $B_2$ is calculated, in which $R_1=|1-B_1/B_2|$. Next, a second image data $D_2$ of a second document passing through the scan operating region is captured by the image capturing module. If the first luminance difference ratio $R_1$ is smaller than a threshold value, the second image data $D_2$ is compensated with the first luminance gain $G_1$. Whereas, if the first luminance difference ratio $R_1$ is greater than or equal to the threshold value, the second image data $D_2$ is compensated with a second luminance gain $G_2$, in which $G_2=G_1 \times B_1/B_2$.

In an embodiment of the image data luminance compensating method, after the first image data $D_1$ is compensated with the first luminance gain $G_1$ in the sheet-feeding scanning apparatus, a first compensated image data $CD_1$ is outputted, in which $CD_1=G_1 \times D_1$.

In an embodiment of the image data luminance compensating method, after the second image data $D_2$ is compensated with the first luminance gain $G_1$ in the sheet-feeding scanning apparatus, a second compensated image data $CD_2$ is outputted, in which $CD_2=G_1 \times D_2$.

In an embodiment of the image data luminance compensating method, after the second image data $D_2$ is compensated with the second luminance gain $G_2$ in the sheet-feeding scanning apparatus, a second compensated image data $CD_2$ is outputted, in which $CD_2=G_2 \times D_2$.

In an embodiment of the image data luminance compensating method, the threshold value is smaller than 0.1 and greater than or equal to 0.02.

In an embodiment of the image data luminance compensating method, the sheet-feeding scanning apparatus is a sheet-feeding scanner having an automatic paper feeder.

In an embodiment of the image data luminance compensating method, the sheet-feeding scanning apparatus is a multifunction peripheral having an automatic paper feeder.

In an embodiment of the image data luminance compensating method, the sheet-feeding scanning apparatus is a printer having an automatic paper feeder.

In accordance with another aspect of the present invention, there is provided a sheet-feeding scanning apparatus for compensating image data of at least two documents. The at least two documents include a first document and a second document. The sheet-feeding scanning apparatus includes a scan operating region, an image capturing module, a sheet-feeding mechanism and a reference background strip. The image capturing module is disposed on a first side of the scan operating region for scanning the first document passing through the scan operating region to generate a first image data $D_1$ and scanning the second document passing through the scan operating region to generate a second image data $D_2$. The sheet-feeding mechanism is used for successively transporting the first document and the second document across the scan operating region. The reference background strip is disposed on a second side of the scan operating region. The luminance value of the reference background strip is sensed by the image capturing module before the first document enters the scan operating region, thereby obtaining a first reference luminance value $B_1$. The luminance value of the reference background strip is sensed by the image capturing module after the first document has been exited from the scan operating region and before the second document enters the scan operating region, thereby obtaining a second reference luminance value $B_2$. The second image data $D_2$ is compensated with a selected luminance gain according to a luminance difference ratio R between the first reference luminance value $B_1$ and the second reference luminance value $B_2$.

In an embodiment of the sheet-feeding scanning apparatus, the relation between the first reference luminance value $B_1$, the second reference luminance value $B_2$ and the luminance difference ratio R is obtained as: $R=|1-B_1/B_2|$.

In an embodiment of the sheet-feeding scanning apparatus, the first image data $D_1$ is compensated with the first luminance gain $G_1$, thereby outputting a first compensated image data $CD_1$, in which $CD_1=G_1 \times D_1$; and the second image data $D_2$ is compensated with the first luminance gain $G_1$ if the first luminance difference ratio $R_1$ is smaller than a threshold value, thereby outputting a second compensated image data $CD_2$, in which $CD_2=G_1 \times D_2$.

In an embodiment of the sheet-feeding scanning apparatus, the threshold value is smaller than 0.1 and greater than or equal to 0.02.

In an embodiment of the sheet-feeding scanning apparatus, the first image data $D_1$ is compensated with the first luminance gain $G_1$, thereby outputting a first compensated image data $CD_1$, in which $CD_1=G_1 \times D_1$; and the second image data $D_2$ is compensated with the second luminance gain $G_2$ if the first luminance difference ratio $R_1$ is greater than or equal to a threshold value, thereby outputting a second compensated image data $CD_2$, in which $G_2=G_1 \times B_1/B_2$, and $CD_2=G_2 \times D_2$.

In an embodiment of the sheet-feeding scanning apparatus, the threshold value is smaller than 0.1 and greater than or equal to 0.02.

In an embodiment of the sheet-feeding scanning apparatus, a lower surface of the sheet-feeding mechanism is used as the reference background strip.

In an embodiment of the sheet-feeding scanning apparatus, the reference background strip is disposed on a bottom of the sheet-feeding mechanism.

In an embodiment of the sheet-feeding scanning apparatus, the reference background strip is a sheet-pressing slice.

Preferably, the sheet-feeding scanning apparatus is a sheet-feeding scanner having an automatic paper feeder.

Preferably, the sheet-feeding scanning apparatus is a multifunction peripheral having an automatic paper feeder.

Preferably, the sheet-feeding scanning apparatus is a printer having an automatic paper feeder.

The above objects and advantages of the present invention will become more readily apparent to those ordinarily skilled in the art after reviewing the following detailed description and accompanying drawings, in which:

BRIEF DESCRIPTION OF THE DRAWINGS

FIG. 6 schematically illustrates a flowchart of an image data luminance compensating method according to the present invention.

DETAILED DESCRIPTION OF THE PREFERRED EMBODIMENT

The present invention relates to a sheet-feeding scanning apparatus for compensating image data of at least two documents. The configurations and the operations of the sheet-feeding scanning apparatus will be illustrated with reference to FIGS. 1, 2, 3 and 4.

Figure 1:
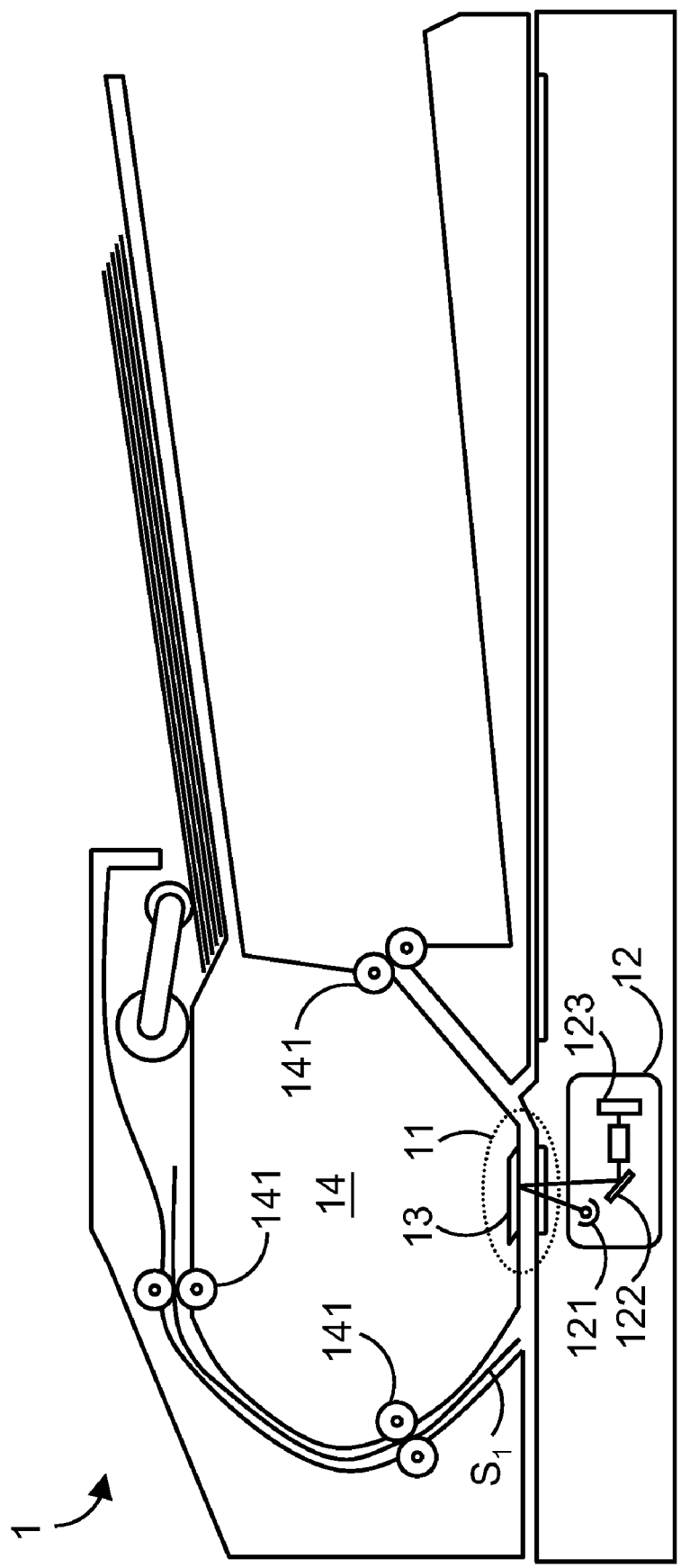
FIGS. 1, 2, 3 and 4 are schematic cross-sectional views illustrating the configurations and the operations of a sheet-feeding scanning apparatus according to a preferred embodiment of the present invention.

FIG. 1 is a schematic cross-sectional view of a sheet-feeding scanning apparatus according to a preferred embodiment of the present invention. The sheet-feeding scanning apparatus 1 principally comprises a scan operating region 11, an image capturing module 12, a reference background strip 13 and a sheet-feeding mechanism 14. The image capturing module 12 comprises a lamp tube 121, an optical element 122 and a sensor chip 123. The light beams emitted by the lamp tube 121 are projected on the document passing through the scan operating region 11. The light beams reflected by the surface of the document are transmitted to the sensor chip 123 by the optical element 122, thereby generating an image data. In this embodiment, the image capturing module 12 and the reference background strip 13 are disposed on opposite sides of the scan operating region 11. When a document passes through the scan operating region 11, the image of the document is captured by the image capturing module 12, thereby generating an image data. If no document passes through the scan operating region 11, the luminance value of the reference background strip 13 is sensed by the image capturing module 12. The luminance value of the reference background strip 13 is used as a reference luminance value for compensating the image data of the next document passing through the scan operating region 11. The sheet-feeding mechanism 14 comprises a plurality of rollers 141 and other transmission elements (not shown) for successively transporting at least two documents through the scan operating region 11.

The operations of the sheet-feeding scanning apparatus 1 will be successively illustrated with reference to FIGS. 1, 2, 3 and 4. Please refer to FIG. 1 again. After the sheet-feeding scanning apparatus 1 is turned on, a first document $S_1$ and a second document $S_2$ are successively fed into the sheet-feeding scanning apparatus 1 by the sheet-feeding mechanism 14. Before the first document $S_1$ enters the scan operating region 11, the luminance value of the reference background strip 13 is sensed by the image capturing module 12, thereby obtaining a first reference luminance value $B_1$.

Figure 2:
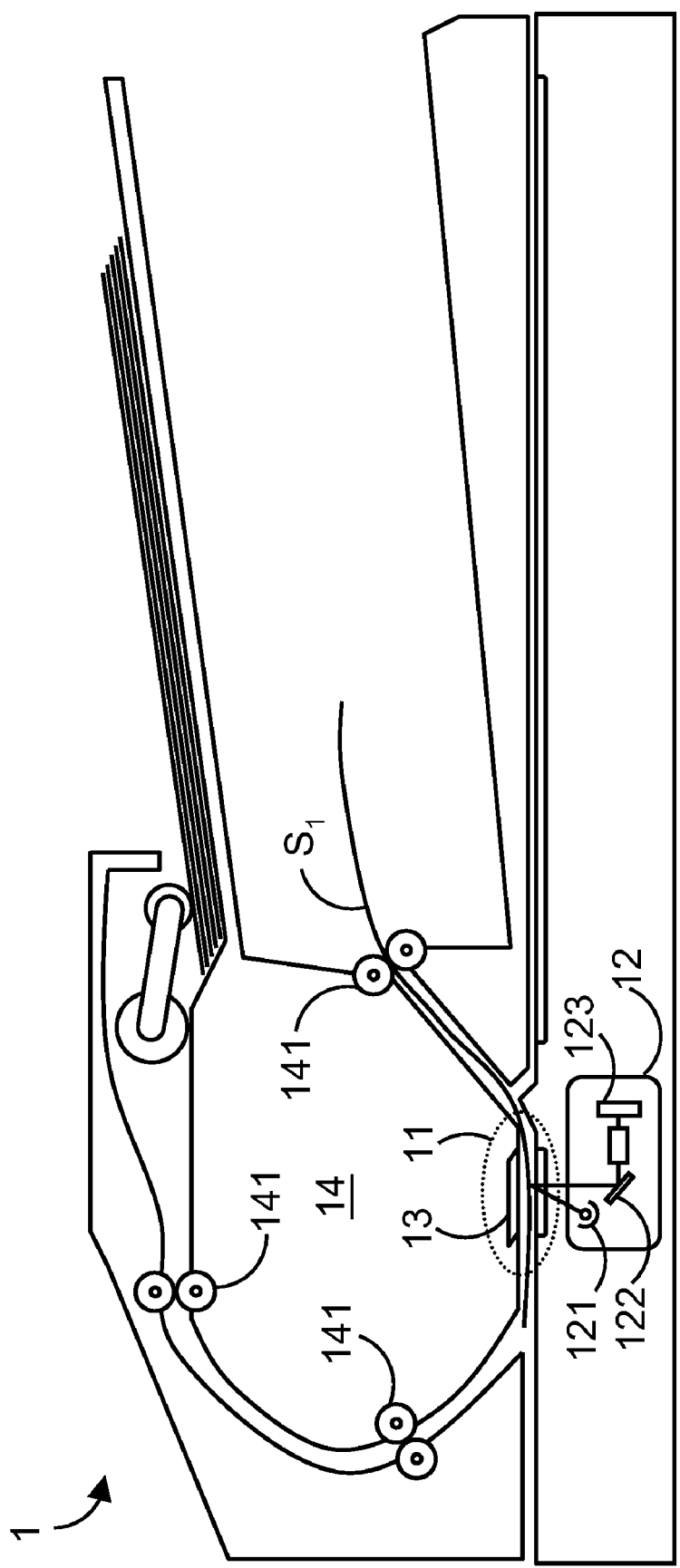

Next, as shown in FIG. 2, the first document $S_1$ is transported across the scan operating region 11. The image of the first document $S_1$ is captured by the image capturing module 12 so as to generate a first image data $D_1$. The first image data $D_1$ is compensated with a preset first luminance gain $G_1$ to obtain a first compensated image data $CD_1$, in which $CD_1=G_1 \times D_1$.

Figure 3:
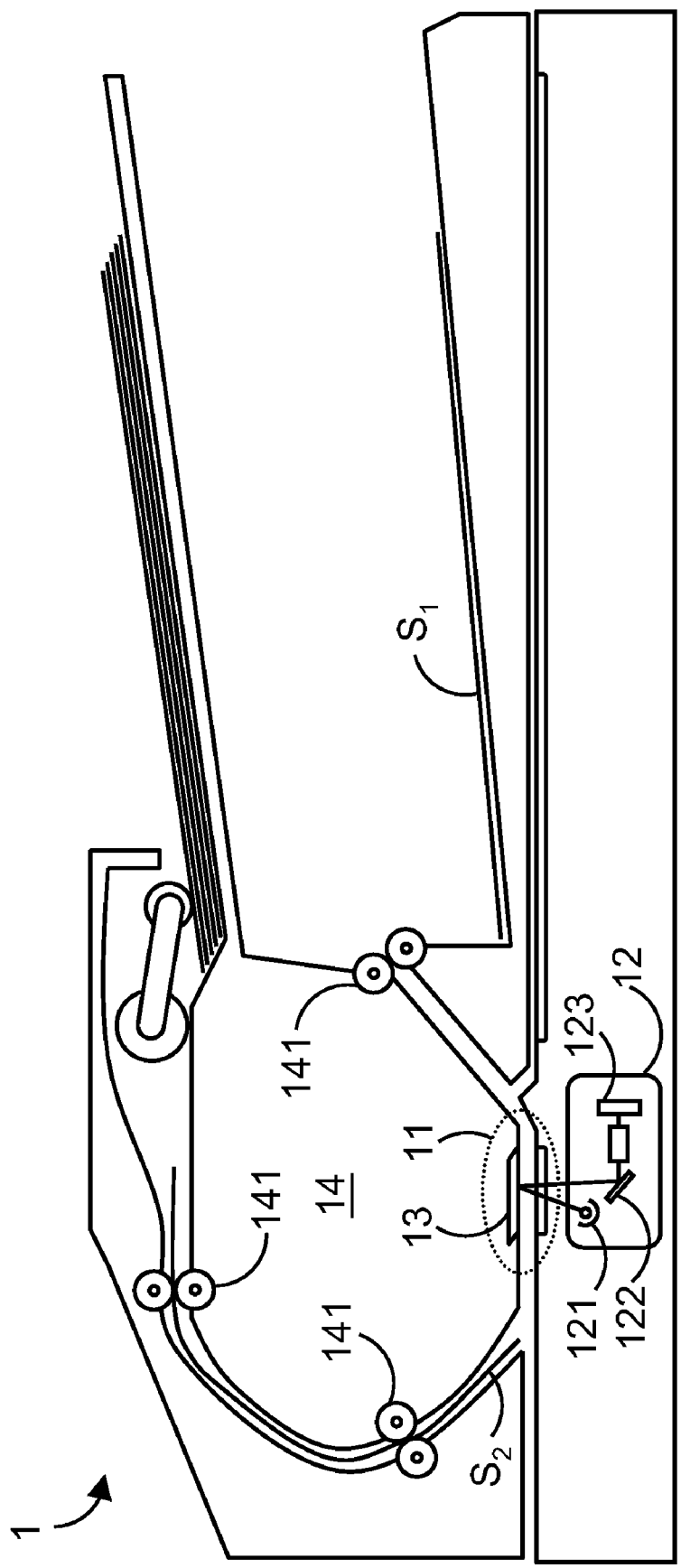
Figure 4:
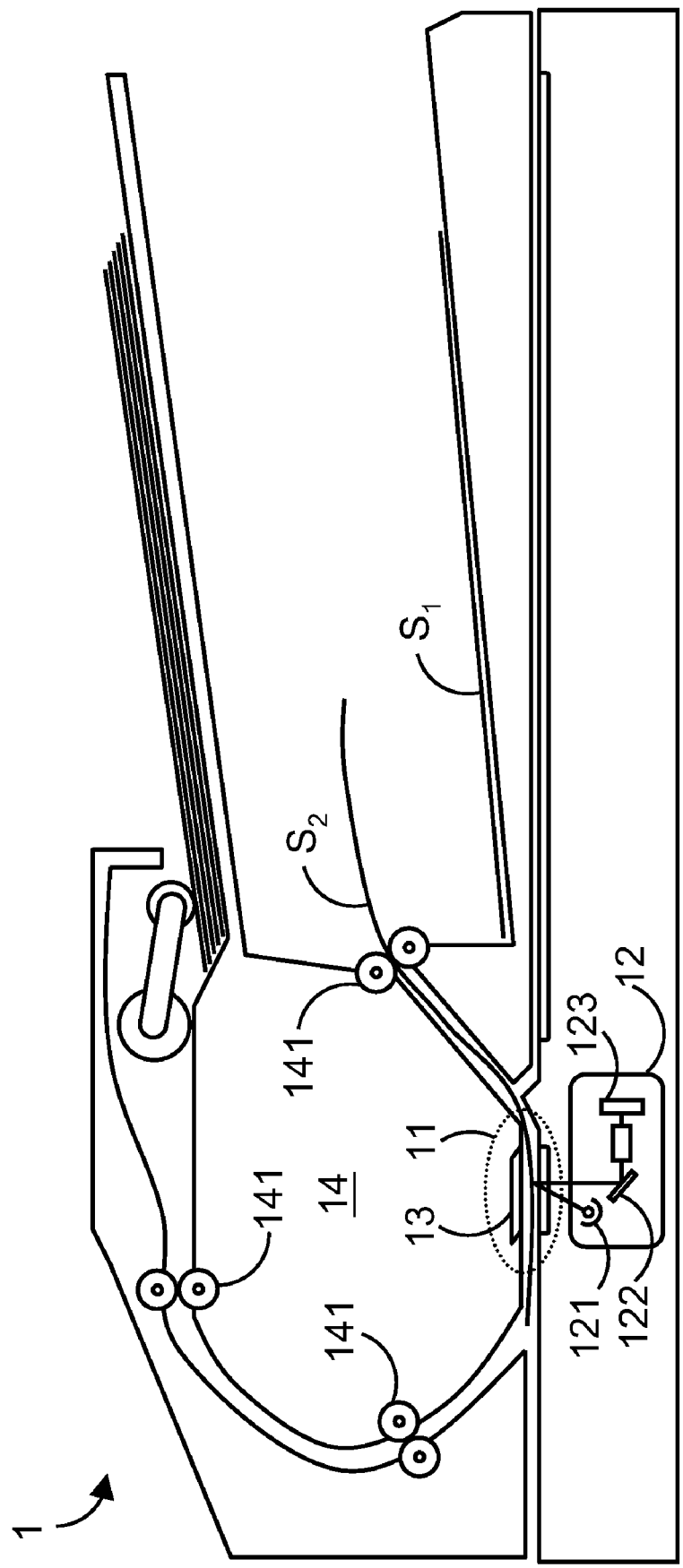

Next, as shown in FIG. 3, after the first document $S_1$ has been exited from the scan operating region 11 and before the second document $S_2$ enters the scan operating region 11, the luminance value of the reference background strip 13 is sensed by the image capturing module 12, thereby obtaining a second reference luminance value $B_2$. Next, as shown in FIG. 4, the second document $S_2$ is transported across the scan operating region 11. The image of the second document $S_2$ is captured by the image capturing module 12 so as to generate a second image data $D_2$.

Next, a luminance difference ratio R between the first reference luminance value $B_1$ and the second reference luminance value $B_2$ is calculated, in which $R=|1-B_1/B_2|$. Depending on the luminance difference ratio R, the second image data $D_2$ is compensated with either the first luminance gain $G_1$ or a second luminance gain $G_2$. In a case that the luminance difference ratio R is smaller than a threshold value, the first reference luminance value B1 and the second reference luminance value B2 approach their stable states. That is, the lamp tube 121 approaches the stable state. In this situation, the second image data $D_2$ is also compensated with the first luminance gain $G_1$ to obtain a second compensated image data $CD_2$, in which $CD_2=G_1 \times D_2$. In another case that the luminance difference ratio R is greater than or equal to the threshold value, the first reference luminance value $B_1$ and the second reference luminance value $B_2$ have not yet approached their stable states. That is, the luminance of the lamp tube 121 is still unstable. In this situation, the second image data $D_2$ is compensated with the second luminance gain $G_2$ to obtain the second compensated image data $CD_2$, in which $CD_2=G_2 \times D_2$. In this embodiment, the relation between the second luminance gain $G_2$ and the first luminance gain $G_1$ can be obtained as: $G_2=G_1 \times B_1/B_2$.

Depending on the specifications of the sheet-feeding scanning apparatus 1, the threshold value is varied. For the sheet-feeding scanning apparatus 1 of the present invention, the threshold value is smaller than 0.1 and greater than or equal to 0.02. As the threshold value is decreased, the compensating efficacy for each image data is increased.

Please refer to FIGS. 1, 2, 3 and 4 again. The reference luminance values $B_1$ and $B_2$ of the reference background strip 13 are respectively detected before and after the first document $S_1$ passes through the scan operating region 11. The luminance gain associated with compensation of the second image data of the second document $S_2$ is determined according to the reference luminance value change of the reference background strip 13 before and after the first document $S_1$ passes through the scan operating region 11. Similarly, the luminance gain associated with compensation of the third image data of a third document (not shown) is determined according to the reference luminance value change of the reference background strip 13 before and after the second document $S_2$ passes through the scan operating region 11. The above procedures are repeated until the luminance difference ratio R is smaller than the threshold value. Under this circumstance, the lamp tube 121 approaches the stable state and the following image data may be compensated with a constant luminance gain. For example, if the luminance difference ratio R obtained by the reference luminance value change of the reference background strip 13 before and after the $N^{th}$ document passes through the scan operating region 11 is smaller than the threshold value, the image data of the $(N+1)^{th}$ document is compensated with the constant luminance gain.

Figure 5B:
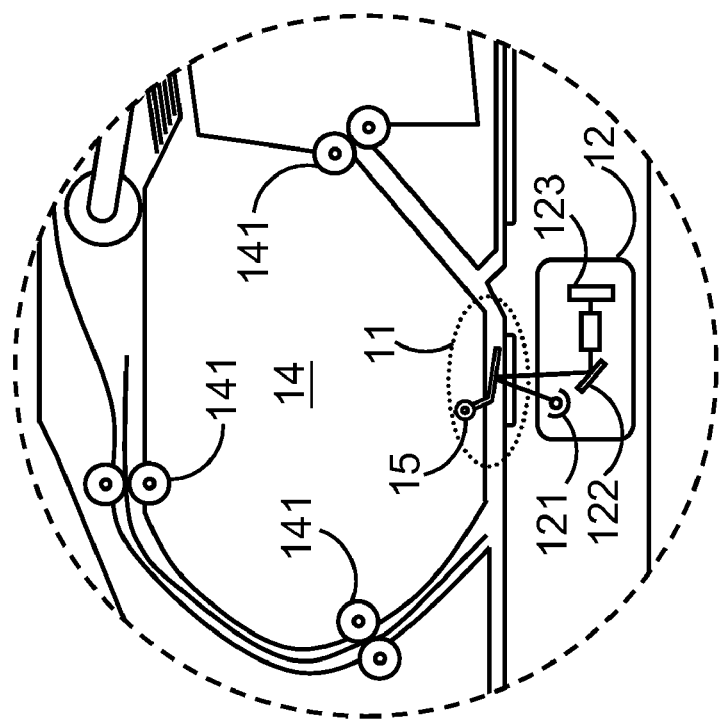
FIGS. 5A and 5B are schematic cross-sectional views illustrating two alternative exemplary reference background strip used in the sheet-feeding scanning apparatus of the present invention.
Figure 5A:
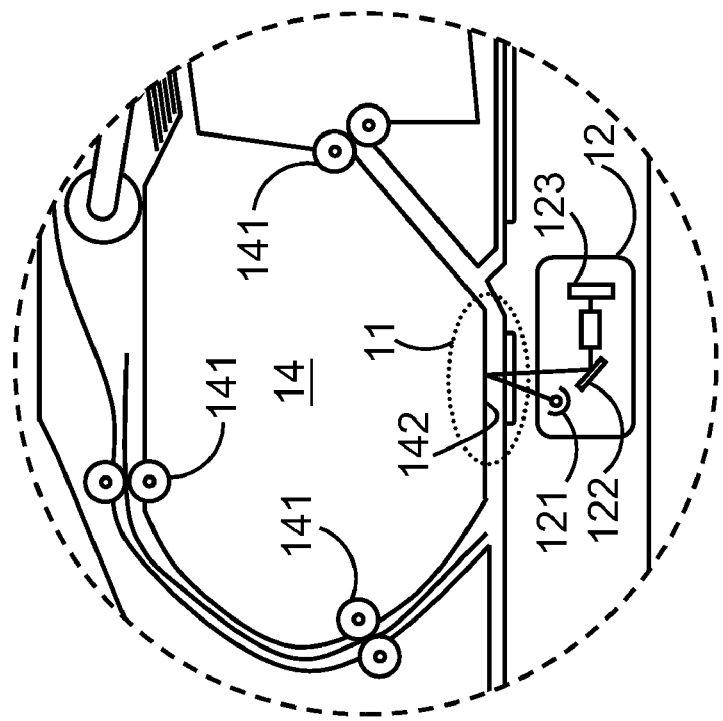

In the above embodiments, the reference background strip 13 is disposed on the bottom of the sheet-feeding mechanism 14 (i.e. the upper side of the scan operating region 11). It is noted that, however, those skilled in the art will readily observe that numerous modifications and alterations may be made while retaining the teachings of the invention. For example, as shown in FIG. 5A, the lower surface 142 of the sheet-feeding mechanism 14 may be directly utilized as the reference background strip. Alternatively, as shown in FIG. 5B, a sheet-pressing slice 15 is utilized as the reference background strip.

FIG. 6 schematically illustrates a flowchart of an image data luminance compensating method according to the present invention. The image data luminance compensating method is applied to a sheet-feeding scanning apparatus. The sheet-feeding scanning apparatus comprises a scan operating region, an image capturing module and a reference background strip. The image capturing module and the reference background strip are disposed on opposite sides of the scan operating region. The image data luminance compensating method comprises the following steps. First of all, the luminance value of the reference background strip is sensed by the image capturing module, thereby obtaining a first reference luminance value $B_1$. Next, a first document is transported across the scan operating region and the image of the first document is captured by the image capturing module so as to generate a first image data $D_1$. Meanwhile, the first image data $D_1$ is compensated with a first luminance gain $G_1$. Next, the luminance value of the reference background strip is sensed by the image capturing module again, thereby obtaining a second reference luminance value $B_2$. Next, a first luminance difference ratio $R_1$ between the first reference luminance value $B_1$ and the second reference luminance value $B_2$ is calculated, in which $R_1=|1-B_1/B_2|$. Next, a second document is transported across the scan operating region and the image of the second document is captured by the image capturing module so as to generate a second image data $D_2$. In a case that the first luminance difference ratio $R_1$ is smaller than a threshold value P, the second image data $D_2$ is compensated with the first luminance gain $G_1$. Whereas, in another case that the first luminance difference ratio $R_1$ is greater than or equal to the threshold value P, the second image data $D_2$ is compensated with a second luminance gain $G_2$.

Please refer to FIG. 6 again. The reference luminance values of the reference background strip are respectively detected before and after the first document passes through the scan operating region. The luminance gain associated with compensation of the second image data of the second document is determined according to the reference luminance value change of the reference background strip before and after the first document passes through the scan operating region. If the luminance difference ratio is greater than or equal to the threshold value P, the luminance gain associated with compensation of the third image data of a third document is determined according to the reference luminance value change of the reference background strip before and after the second document passes through the scan operating region. The above procedures are performed until the luminance difference ratio is smaller than the threshold value. For example, if the luminance difference ratio R obtained by the reference luminance value change of the reference background strip before and after the $N^{th}$ document passes through the scan operating region is smaller than the threshold value, the image data following the $(N+1)^{th}$ document are all compensated with a constant luminance gain $G_N$.

In the image data luminance compensating method of the present invention, the threshold value P is preferably smaller than 0.1 and greater than or equal to 0.02.

From the above description, the luminance gain associated with compensation of the image data of the next document is determined according to the reference luminance value change of the reference background strip before and after the current document passes through the scan operating region. By the sheet-feeding scanning apparatus and the image data luminance compensating method of the present invention, the sheet-feeding operation and the scanning operation can be performed immediately after the sheet-feeding scanning apparatus is turned on. Therefore, the user can instantly scan the documents without waiting for the warm-up time period.

The image data luminance compensating method of the present invention is illustrated by referring to a sheet-feeding scanning apparatus having an automatic paper feeder. The sheet-feeding scanning apparatus includes for example a sheet-feeding scanner, a multifunction peripheral or a printer.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An image data luminance compensating method for use in a sheet-feeding scanning apparatus, said sheet-feeding scanning apparatus comprising a scan operating region, an image capturing module and a reference background strip, said image capturing module and said reference background strip are disposed on opposite sides of said scan operating region, said image data luminance compensating method comprising:

sensing the luminance value of said reference background strip by said image capturing module, thereby obtaining a first reference luminance value $B_1$;

capturing a first image data $D_1$ of a first document passing through said scan operating region by said image capturing module, and compensating said first image data $D_1$ with a first luminance gain $G_1$;

sensing the luminance value of said reference background strip by said image capturing module, thereby obtaining a second reference luminance value $B_2$;

calculating a first luminance difference ratio $R_1$ according to said first reference luminance value $B_1$ and said second reference luminance value $B_2$ is calculated, in which $R_1 = |1-B_1/B_2|$; capturing a second image data $D_2$ of a second document passing through said scan operating region by said image capturing module; and compensating said second image data $D_2$ with said first luminance gain $G_1$ if said first luminance difference ratio $R_1$ is smaller than a threshold value, or compensating said second image data $D_2$ with a second luminance gain $G_2$ if said first luminance difference ratio $R_1$ is greater than or equal to said threshold value, in which $G_2 = G_1 \times B_1/B_2$.

2. The image data luminance compensating method according to claim 1 further comprising a step of outputting a first compensated image data $CD_1$ after said first image data $D_1$ is compensated with said first luminance gain $G_1$ in said sheet-feeding scanning apparatus, in which $CD_1 = G_1 \times D_1$.

3. The image data luminance compensating method according to claim 1 further comprising a step of outputting a second compensated image data $CD_2$ after said second image data $D_2$ is compensated with said first luminance gain $G_1$ in said sheet-feeding scanning apparatus, in which $CD_2 = G_1 \times D_2$.

4. The image data luminance compensating method according to claim 1 further comprising a step of outputting a second compensated image data $CD_2$ after said second image data $D_2$ is compensated with said second luminance gain $G_2$ in said sheet-feeding scanning apparatus, in which $CD_2 = G_2 \times D_2$.

5. The image data luminance compensating method according to claim 1 wherein said threshold value is smaller than 0.1 and greater than or equal to 0.02.

6. The image data luminance compensating method according to claim 1 wherein said sheet-feeding scanning apparatus is a sheet-feeding scanner having an automatic paper feeder.

7. The image data luminance compensating method according to claim 1 wherein said sheet-feeding scanning apparatus is a multifunction peripheral having an automatic paper feeder.

8. The image data luminance compensating method according to claim 1 wherein said sheet-feeding scanning apparatus is a printer having an automatic paper feeder.

9. A sheet-feeding scanning apparatus for compensating image data of at least two documents, said at least two documents comprising a first document and a second document, said sheet-feeding scanning apparatus comprising:

a scan operating region;

an image capturing module disposed on a first side of said scan operating region for scanning said first document passing through said scan operating region to generate a first image data $D_1$ and scanning said second document passing through said scan operating region to generate a second image data $D_2$;

a sheet-feeding mechanism for successively transporting said first document and said second document across said scan operating region; and a reference background strip disposed on a second side of said scan operating region, wherein the luminance value of said reference background strip is sensed by the image capturing module before said first document enters said scan operating region, thereby obtaining a first reference luminance value $B_1$; the luminance value of said reference background strip is sensed by the image capturing module after said first document has been exited from said scan operating region and before said second document enters said scan operating region, thereby obtaining a second reference luminance value $B_2$; and said second image data $D_2$ is compensated with a selected luminance gain according to a luminance difference ratio R between said first reference luminance value $B_1$ and said second reference luminance value $B_2$, wherein the relation between said first reference luminance value $B_1$, said second reference luminance value $B_2$ and said luminance difference ratio R is obtained as: $R = |1-B_{1/B2}|$.

10. The sheet-feeding scanning apparatus according to claim 9 wherein said first image data $D_1$ is compensated with a first luminance gain $G_1$, thereby outputting a first compensated image data $CD_1$, in which $CD_1 = G_1 \times D_1$; and said second image data $D_2$ is compensated with said first luminance gain $G_1$ if said first luminance difference ratio $R_1$ is smaller than a threshold value, thereby outputting a second compensated image data $CD_2$, in which $CD_2 = G_1 \times D_2$.

11. The sheet-feeding scanning apparatus according to claim 10 wherein said threshold value is smaller than 0.1 and greater than or equal to 0.02.

12. The sheet-feeding scanning apparatus according to claim 9 wherein said first image data $D_1$ is compensated with said first luminance gain $G_1$, thereby outputting a first compensated image data $CD_1$, in which $CD_1 = G_1 \times D_1$; and said second image data $D_2$ is compensated with said second luminance gain $G_2$ if said first luminance difference ratio $R_1$ is greater than or equal to a threshold value, thereby outputting a second compensated image data $CD_2$, in which $G_2 = G_1 \times B_1/B_2$, and $CD_2 = G_2 \times D_2$.

13. The sheet-feeding scanning apparatus according to claim 12 wherein said threshold value is smaller than 0.1 and greater than or equal to 0.02.

14. The sheet-feeding scanning apparatus according to claim 9 wherein a lower surface of said sheet-feeding mechanism is used as said reference background strip.

15. The sheet-feeding scanning apparatus according to claim 9 wherein said reference background strip is disposed on a bottom of said sheet-feeding mechanism.

16. The sheet-feeding scanning apparatus according to claim 9 wherein said reference background strip is a sheet-pressing slice.

17. The sheet-feeding scanning apparatus according to claim 9 wherein said sheet-feeding scanning apparatus is a sheet-feeding scanner having an automatic paper feeder.

18. The sheet-feeding scanning apparatus according to claim 9 wherein said sheet-feeding scanning apparatus is a multifunction peripheral having an automatic paper feeder.

19. The sheet-feeding scanning apparatus according to claim 9 wherein said sheet-feeding scanning apparatus is a printer having an automatic paper feeder.

* * * * *